(12) United States Patent
Müller et al.

(10) Patent No.: US 7,981,236 B2
(45) Date of Patent: Jul. 19, 2011

(54) METHOD AND DEVICE FOR BONDING TWO SHEETS

(75) Inventors: Henry Müller, Altfraunhofen (DE); Robert Magunia, Elztal-Dallau (DE); Christian Schlemmer, Landshut/Muchnerau (DE); Mand Khosrow Afzalian, Weihmichl (DE); Christoph Riester, Aufirchen (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 0 days.

(21) Appl. No.: 12/620,286

(22) Filed: Nov. 17, 2009

(65) Prior Publication Data

US 2010/0059170 A1 Mar. 11, 2010

Related U.S. Application Data

(62) Division of application No. 11/517,544, filed on Sep. 7, 2006, now abandoned.

(30) Foreign Application Priority Data

Sep. 9, 2005 (DE) .......................... 10 2005 042 995

(51) Int. Cl.
*B29C 67/22* (2006.01)
(52) U.S. Cl. ...................................... 156/213; 264/46.4
(58) Field of Classification Search .................. 156/213; 264/46.4
See application file for complete search history.

(56) References Cited

U.S. PATENT DOCUMENTS

| 4,078,959 A | 3/1978 | Palfey et al. |
| 4,268,559 A | 5/1981 | Smuckler |
| 4,378,393 A | 3/1983 | Smuckler |
| 5,076,880 A * | 12/1991 | Spengler et al. ............... 156/382 |
| 5,133,912 A | 7/1992 | Hagiwara et al. |
| 5,304,273 A | 4/1994 | Kenrick et al. |
| 5,462,786 A | 10/1995 | Van Ert |
| 5,919,324 A | 7/1999 | Moffitt et al. |
| 6,093,272 A | 7/2000 | Visconti et al. |
| 2003/0165664 A1 * | 9/2003 | Carroll et al. ................. 428/138 |

FOREIGN PATENT DOCUMENTS

| DE | 2938270 A1 | 4/1980 |
| DE | 4237274 A1 | 11/1994 |
| DE | 29823765 U1 | 11/1999 |

\* cited by examiner

*Primary Examiner* — Jeff H Aftergut
*Assistant Examiner* — Jaeyun Lee
(74) *Attorney, Agent, or Firm* — Wolf, Greenfield & Sacks, P.C.

(57) ABSTRACT

A method and a device for bonding at least two sheets, is disclosed. The sheets may be joined by a groove and are connected to each other at least in one contact area in the sheet surface of the first sheet. The sheets may first be shaped whereby the first sheet may be shaped with at least one hook which forms an angle with the sheet surface and the second sheet may be shaped with at least one groove and one leg. The hook may be accommodated by the groove and the leg may be substantially parallel to the contact area of the first sheet. The shaped sheets are then bonded to each other, whereby the hook is inserted in the groove and the leg is bonded to the contact area.

12 Claims, 2 Drawing Sheets

METHOD AND DEVICE FOR BONDING TWO SHEETS

CROSS REFERENCE TO RELATED APPLICATION

This application is a Divisional application Ser. No. 11/517,544, filed Sep. 7, 2006, currently pending, which claims foreign priority benefits under 35 U.S.C. §119(a)-(d) or 35 U.S.C. §365(b) of German Application No. 10 2005 042 995.5, filed Sep. 9, 2005, which is hereby incorporated by reference in its entirety.

BACKGROUND OF THE INVENTION

1. Field

The present invention relates to a method and a device for bonding sheets of material. It should be appreciated that, the term "sheets" should is restricted to plastic sheets, the term "sheets" also includes all other suitable materials for producing a surface skin, such as, for example, leather, synthetic leather, non-wovens, textiles, etc.

2. Discussion of Related Art

Components, such as, for example, interior trim panels for motor vehicles are designed with more than one surface to achieve specific aesthetic effects. For example, two-colored components can be produced by using different colored sheets. It is also conceivable to use different sheets to provide better protection for certain areas of a component that are exposed to a greater degree of wear.

In this regard, it is known, for example, to bring the sheets to be bonded into flat contact and to weld them to each other. However, one drawback with this technology is that a weld mark results in the visible region of the components. To satisfy aesthetic demands it is therefore generally necessary to cover the weld mark with decorative coverings or fittings.

DE 298 23 765 U 1 describes bonding sheets for an interior trim panel for vehicles to each other in a groove perpendicular to the sheet surface. To achieve a reliable bond in this regard, a deep groove is created perpendicular to the sheet surface. The sheets are then back-foamed. In this regard, the deep groove acts as a barrier to the foam flow, making back-foaming without the formation of voids difficult.

U.S. Pat. No. 5,304,273 describes bonding the sheets via a groove, whereby the sheets are also held together by a clip. In this regard, the sheets can be shaped to provide a sheet with a U-shaped end area into which a leg on the end area of the second sheet engages. The drawback of employing the clip, however, is the additional assembly stage required.

JP 04143136 A describes bonding sheets to each other via a groove and gluing the sheets to each other in an overlapping region next to the groove. To accomplish this, the groove is formed in a first sheet and the second sheet is introduced into the groove in an unshaped fashion and glued to the first sheet on the overlapping region. Then the groove with the end area of the second sheet inserted therein is shaped so that the second sheet is provided with a hook. Then the sheets are turned and placed in a mold. The bond between the first sheet and the second sheet is reinforced in the mold by a glass fiber layer. One drawback of the method is the necessity of turning the sheets before reinforcing the bond by the glass fiber layer.

SUMMARY

In one illustrative embodiment, a method for bonding two sheets is provided. The sheets are joined together by a groove and at least in one contact area in the sheet surface of the first sheet is bonded to each other. The method includes shaping the first and the second sheet. The first sheet is shaped with one hook which forms an angle with the sheet surface. The second sheet is shaped with at least one groove and one leg. The hook may accommodate the groove and the leg is substantially parallel to the contact area of the first sheet. This method also includes bonding the shaped sheets. The hook is inserted in the groove and the leg is bonded to the contact area.

In another illustrative embodiment, a device for bonding two sheets is provided. The device includes a holder that is constructed and arranged to join the sheets. The sheets are joinable by a groove and bondable to each other at least in one contact area in the sheet surface of the first sheet. The holder is adapted to hold the first sheet. The first sheet is provided with at least one hook which forms an angle with the sheet surface. The first sheet is held in the holder in a manner whereby the first sheet can be bonded to a second sheet. The second sheet is provided with at least one groove and one leg. The hook is adapted to be accommodated by the groove and the leg is substantially parallel to the contact area of the first sheet so that the hook is insertable in the groove and the leg is adapted to be bonded to the contact area on the sheet surface of the first sheet.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

Figure 1:
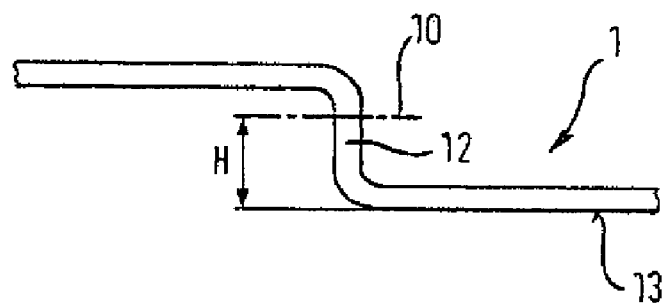
FIG. 1 is a schematic representation of a first sheet having a hook.

A method and a device for bonding two sheets, whereby the sheets are joined via a groove and the suitability for further treatment of the bonded sheets, is provided.

To bond two sheets, which are joined via a groove, the first and the second sheet are shaped at least in one contact area in the sheet surface of a first sheet. The first sheet may be formed with a hook, which forms an angle with the sheet surface. The second sheet may be shaped with a groove and a leg, whereby the size of the groove is selected in such a way that the hook can be accommodated by the groove and the leg is substantially parallel to the contact area on the sheet surface of the first sheet. The shaped sheet areas may then be bonded so that the hook is introduced into the groove and the leg is bonded to the contact area. The joining of ready-shaped sheets means further treatment of the sheets, for example back-foaming, is directly possible. The shaping of the sheets to be bonded is performed completely independently of each other. Suitable methods for shaping can, therefore, be selected in accordance with the material to be used in each case, as the present invention is not limited in this regard. The bonding of the sheets in the leg and the contact area in the sheet surface endows the bond with a high degree of strength. In this regard, the leg length is optional. The hook in the first sheet is preferably substantially perpendicular to the sheet surface to reduce undercuts during subsequent treatment. Depending upon the nature of the further treatment of the joined sheets, however, it is also possible to form another angle.

In one embodiment, the first sheet is held in a holder and the second sheet applied to the first sheet. In this regard, the rear of the sheets is directly available for further treatment, for example back-foaming and/or coating. Therefore, in one embodiment, it is possible to perform this further treatment in the same tool.

In one embodiment, the first sheet is held in the holder by vacuum and/or by a counterstamp. The use of vacuum may permit the reliable positioning of the first sheet in the holder independently of the material used for the sheet. In the case of rigid sheets, the use of a counterstamp may be more desirable and is inexpensive to implement.

In a further embodiment, before the shaped sheets are bonded, an adhesive layer on the contact area is applied to the first sheet. It should be appreciated that the present invention is not limited in this regard, as the contact area and the second sheet can be welded and/or bonded to each other. Suitable adhesives include conventional adhesives and/or sealants and adhesive tapes. The choice of a suitable adhesive is determined by the material pairing selected for the sheets. The adhesive is preferably applied flat, for example sprayed or rolled on. However, it is also possible, for example, to bond the leg by a sealing bead (fixed and/or foamed) on the edge to the contact area of the first sheet.

In a further embodiment, the adhesive layer is also applied to the hook of the first sheet. In this regard, the two adhesive layers can be bonded to each other. In one embodiment, no adhesive is applied in the region between the hook and the sheet surface so as to reduce or avoid the formation of lumps in the transitional area.

In a further embodiment, the sheets are pressed against each other by a stamp. In this regard, the stamp interacts with the holder. The stamp permits the rapid and automatable application of pressure on the sheets.

In a further embodiment, the sheets are pressed against each other by a roller. In one embodiment, the roller is spring-mounted. The roller may enable differently shaped sheets, each of which can be accommodated by the holder, to be bonded to each other, aiding in rapid adaptation to different embodiments of the bond.

In one embodiment, the roller is guided by a robot or manipulator. In addition, manual guidance of the roller is also possible, as the present invention is not limited in this regard. Manipulator guidance of the roller may aid in the rapid and automatable application of high forces.

In a further embodiment, the holder is provided with a strut, whereby at least the hook on the first sheet is held by the strut during bonding. The strut may improve the stability of the holder of the first sheet during bonding with the second sheet. The groove formed in the second sheet may be joined by the hook and the strut. In one embodiment, to accomplish this, the strut is very thin.

In one embodiment, the sheets are provided with a carrier after bonding. In one embodiment, the carrier behind the bonded sheets may be provided without changing the tool. However, it is also possible to place the sheets in another tool for the provision and/or insertion of the carrier, as the present invention is not limited in this regard.

The carrier is formed, for example, by back-foaming, injection molding, injection compression molding or a by employing strand palletising method. It is also possible to shape the carrier behind a sheet for example by means of long-fiber injection (LFI) technology or comparable techniques or the insertion of a glass mat, a fabric, a knitted fabric or a non-woven and insertion of a suitable polyurethane (PU) system using open or closed filling technology, as the present invention is not limited in this regard.

In one embodiment, the strut is mobile. In this regard, when a specific pressure is reached during the back-foaming or the formation of the carrier, the strut can be retracted from the groove so that the gap created by the thin strut is closed during the back-foaming and/or during the carrier formation. Alternatively, it is also possible for the strut to only be extracted after the solidification of the foam or another carrier material if the formation of a gap with a defined width is desired, as the present invention is not limited in this regard In one embodiment, the sheets are produced from rolled goods. In this regard, the sheets are first shaped and then cut off the roll. Shaping before cutting enables specific geometries to be well matched to each other and the areas of sheet to be produced from the rolled goods without high material losses; however, the as the present invention is not limited in this regard, as the sheets may be cut before being shaped.

In a further embodiment, the first sheet is provided with a leg at the end of the hook. The size of the leg enables an optional distance to be established between the bonded sheets. This distance may, for example, be desirable if a decorative element is to be applied between the sheets. If the first sheet is provided with an additional leg, the bond between the two sheets can also be stabilized in the base of the groove.

In a further embodiment, the second sheet is provided with a second groove at the end of the leg, whereby the length of the leg corresponds to the length of the area laminated with the first sheet. In one embodiment, small areas, which are to be laminated with a first sheet, may completely cover the second sheet.

A device for bonding two sheets is also contemplated. The device includes a holder adapted to hold the sheets, whereby the sheets may be joined by a groove and bonded to each other at least in one contact area in the sheet surface of the first sheet. In this regard, the first sheet can be held in the holder, whereby the first sheet is provided at least with one hook forming an angle with the sheet surface. In one embodiment, the sheet may be held in the holder in such a way that the hook lies on the side of the sheet facing away from the holder. The first sheet held in the holder can be bonded to a second sheet, whereby the second sheet is provided with at least one groove and one leg, the hook can be accommodated by the groove and the leg is essentially parallel to the contact area, so that the hook may be inserted in the groove and the leg may be bonded by the contact area to the sheet surface of the first sheet.

Turning now to the figures, and in particular to FIG. 1, which is a schematic diagram of a first sheet 1; one illustrative embodiment in shown. The sheet 1 is rolled off a sheet roll (not shown) and shaped with a hook 12. The surface of the sheet visible in the installed condition on the motor vehicle is identified with reference number 13. Any tools may be used to shape the sheet 1 as the present invention is not limited in this regard. The sheet 1 is separated from the sheet roll along an interface 10. The separation is preferably performed after the shaping of the sheet 1, however, separation can occur of the shaping, as the present invention is not limited in this regard. In the embodiment shown, the hook 12 is substantially perpendicular to the sheet surface. However, other angles are also conceivable, as the present invention is not limited in this regard. In one embodiment, the hook 12 has the height H.

Figure 2:
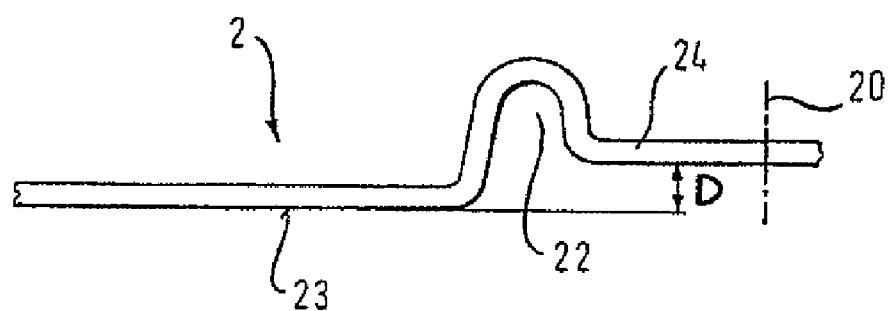
FIG. 2 is a schematic representation of a second sheet having a groove and a leg.

FIG. 2 is a schematic view of a second sheet 2, which is rolled off a second sheet roll (again not shown). It should be appreciated that where the material of the first and second sheets are the same, the second sheet may be supplied from the first roll and no second roll need be employed. A groove 22 and a leg 24 are shaped in the sheet 2. The visible surface of the sheet 2 is identified with reference number 23. Any tool may be used in this regard for the shaping, as the present invention is not limited in this regard. The groove 22 is sufficiently large to accommodate the hook 12 of the height H shown in FIG. 1. The leg 24 is parallel to the sheet surface of the sheet 1 shown in FIG. 1. The distance D of the leg 24 to the sheet surface of the sheet 2 corresponds to the material thickness of the sheet 1 shown in FIG. 1 and an adhesive layer to be applied. The sheet 2 is preferably separated from the sheet roll at the point 20 after the formation of the groove 22 and the leg 24, however, as with sheet 1, separation can occur after shaping, as the present invention is not limited in this regard. The groove 22 shown in FIG. 2 is rounded. However, a rectangular groove shape is also conceivable, as the present invention is not limited in this respect. The rounded edges however, may be advantageous in some circumstances as sharp angles are avoided.

Figure 3:
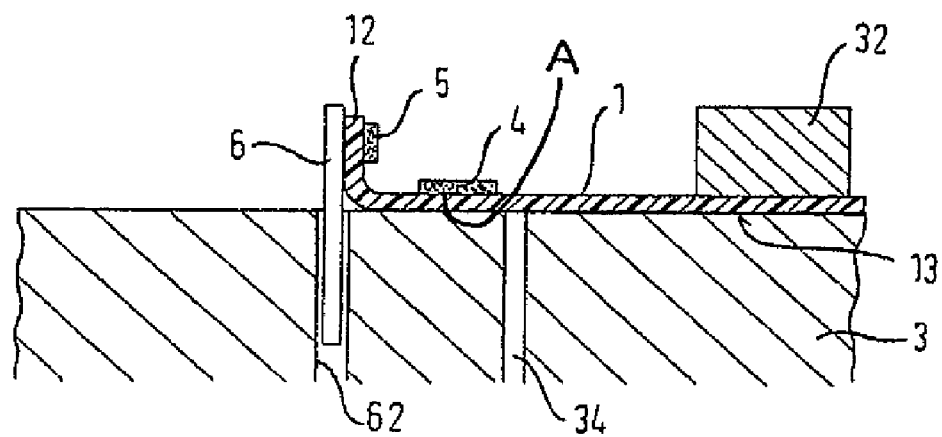
FIG. 3 is a holder in which the first sheet is held.

FIG. 3 is a schematic diagram of the cross section of a holder 3, whereby the holder accommodates a first sheet 1. The first sheet 1 may be held substantially flat by the holder 3, whereby the hook 12 comes to lie on the side of the sheet 1 facing away from the holder 3 and faces the visible surface 13 of the holder 3. The sheet 1 is held on the holder 3 by a counterarea 32 and/or by a vacuum. For holding by vacuum, in one embodiment suction holes 34 are provided.

The holder 3 is also embodied with a thin strut 6 which may be moved along a guide 62. The strut 6 may improve the holding of the sheet 1 in the holder 3. In the representation, strut 6 protrudes over the hook 12. However, the strut 6 can also be shorter than or equal to the length of the hook 12 as the present invention is not limited in this regard.

An adhesive layer 4 is applied to a contact area A of the sheet 1. In addition, an adhesive layer 5 is applied to the hook 12 in the sheet 1. It should be appreciated that the thicknesses of the adhesive layers 4 and 5 are depicted in greatly exaggerated form.

The strut 6 is also depicted in exaggerated form. The strut 6 can comprise one or more areas, as the present invention is not so limited. In one embodiment, in the plane parallel to the groove 22 running perpendicular to the plane of projection, a multi-part strut may be employed. Furthermore, instead of a displaceable strut, a fixed strut may be used, as the present invention is not limited in this regard.

Figure 4:
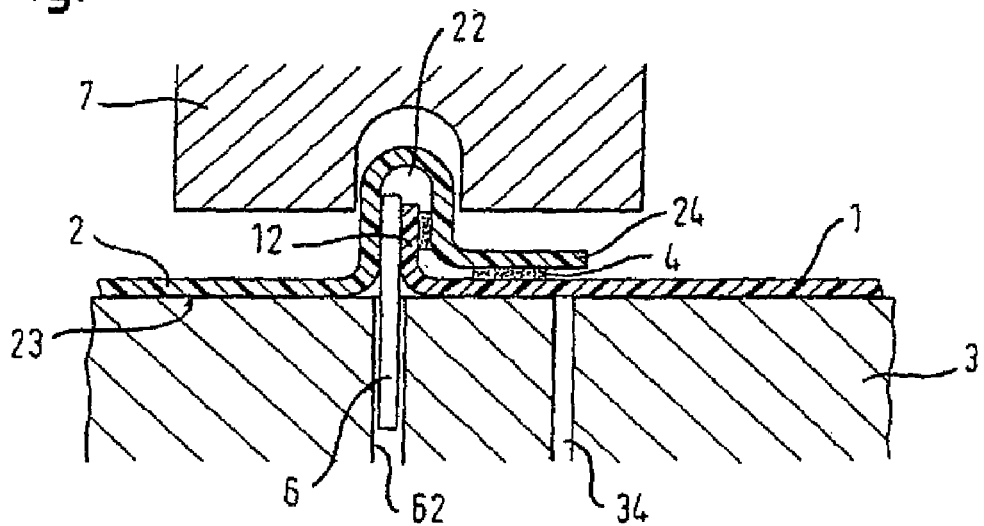
FIG. 4 shows bonding of the first sheet to the second sheet by way of a stamp.

FIG. 4 is a schematic diagram of the holder 3 according to FIG. 1, whereby the sheet 2 according to FIG. 2 is bonded to the sheet 1 so that the hook 12 and the strut 6 are accommodated by the groove 22 in the sheet 2. The visible surface 23 of the sheet 2 is accommodated by the holder 3. The leg 24 is bonded to the sheet 1 by the adherent surface 4 applied to the contact area A. The sheets are pressed onto each other in a positive connection by a stamp 7.

Figure 5:
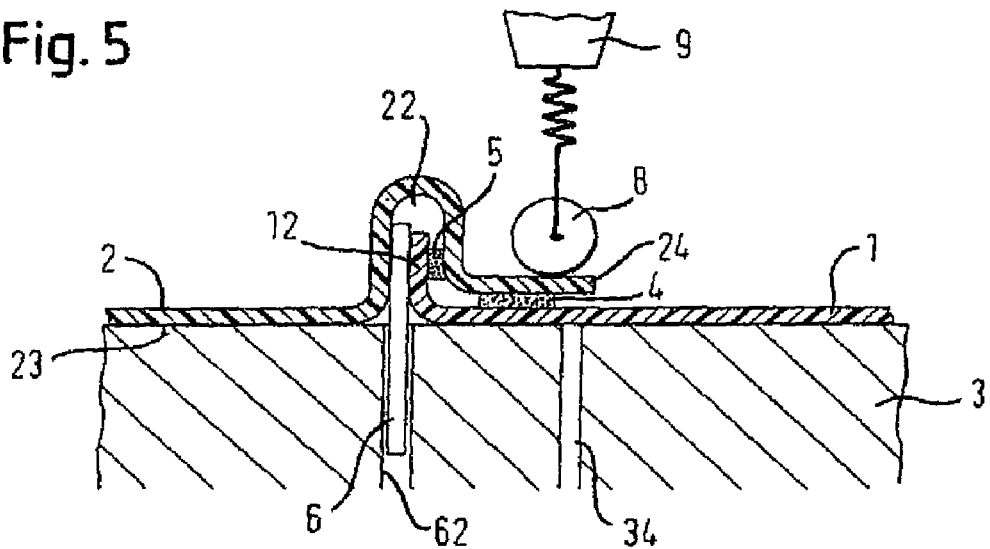
FIG. 5 shows bonding of the first sheet to the second sheet by way of a roller.

FIG. 5 shows another illustrative embodiment. In this embodiment, the sheet 2 of FIG. 2 is applied to the sheet 1 in the holder 3 of FIG. 3, whereby the hook 12 and the strut 6 are inserted in the groove 22. The leg 24 is bonded to the sheet 1 by the adherent surface 4 applied to the contact area A. The sheets 1 and 2 in the bonded joints 4 and 5 are pressed onto each other with a retracting roller 8. In one embodiment, the roller 8 is spring-mounted and guided by a manipulator 9. However, manual guidance of the roller 8 is also conceivable as the present invention is not limited in this regard.

Figure 6:
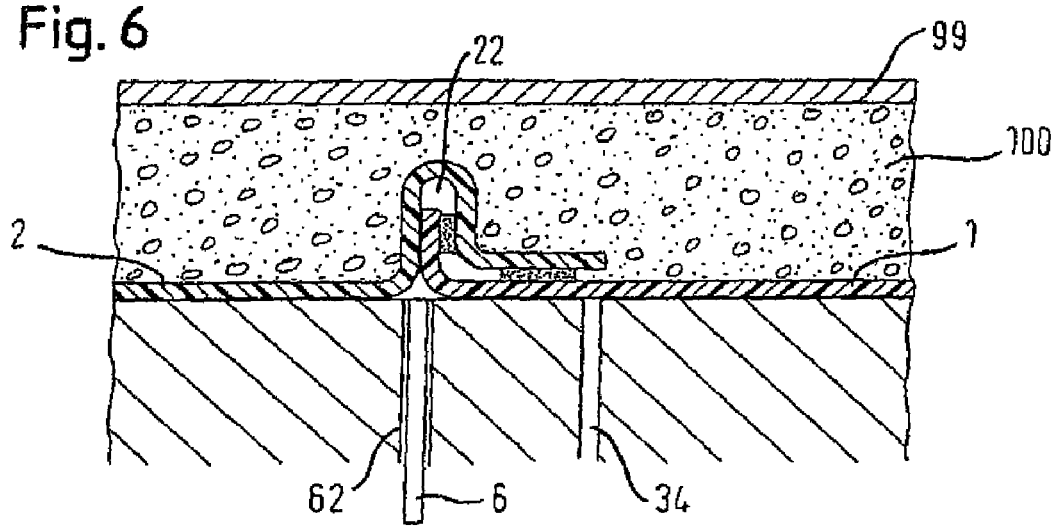
FIG. 6 shows back-foaming of the bonded sheets.

FIG. 6 is a schematic diagram of the sheets 1 and 2 bonded to each other, which are held on the holder 3. A mold 99 is placed over the sheets bonded together and the region between the sheets 1 and 2 and the mold 99 is back-foamed. In one embodiment, polyurethane foam 100, is employed for back-foaming.

After achieving a specific pressure in the intermediate space between the sheets 1 and 2 and the mold 99 by the foaming polyurethane 100, the movable strut 6 can be retracted along the rails 62. Due to the prevailing pressure, the gap created by the strut 6 between the sheets 1 and 2 is closed. If it is desirable for a gap to remain between the sheets 1 and 2, a leg (not shown), for example, may be provided on the hook 12 of the sheet 1. The leg preferably extends parallel to the sheet surface and comes into contact with the groove base. The length of the leg enables the gap width to be set as desired. The application of an adhesive layer on the leg may be employed to improve the bond still further.

Since the sheets are bonded to each other along the sheet surface by the adhesive layer 4, a small depth of the groove 22 is sufficient for a stable bonding of the sheets 1 and 2. This means the filling of the intermediate space with polyurethane 100 is hardly impeded by the groove 22.

The sheets are used, for example, as a panel in a motor vehicle interior. The method according to the invention and/or the device according to the invention may be used to bond different shapes and/or materials to each other. A holder, an adhesive and/or a method for applying the adhesive can in this regard be adapted to match the different shapes and/or materials used for sheets.

Having thus described several aspects of at least one embodiment of this invention, it is to be appreciated various alterations, modifications, and improvements will readily occur to those skilled in the art. Such alterations, modification, and improvements are intended to be part of this disclosure, and are intended to be within the spirit and scope of the invention. Accordingly, the description and drawings herein are by way of example only.

What is claimed:

1. A method for bonding two sheets, whereby the sheets are joined together by a groove and at least in one contact area in the sheet surface of the first sheet bonded to each other, comprising:
   a. shaping the first and the second sheet, whereby the first sheet is shaped with at least one hook which forms an angle with the sheet surface and the second sheet is shaped with at least one groove and one leg, whereby the hook may be accommodated by the groove and the leg is substantially parallel to the contact area of the first sheet;
   b. bonding the shaped sheets, whereby the hook is inserted in the groove and the leg is bonded to the contact area;
   c. applying an adhesive layer at least to the contact area on the first sheet before bonding the shaped sheets; and
   d. forming a carrier behind the bonded sheets by back-foaming and/or by injection molding.

2. The method according to claim 1, wherein during bonding, the first sheet is held in a holder and the second sheet is applied to the first sheet.

3. The method according to claim 2, wherein the first sheet is held in the holder by vacuum and/or by a counterstamp.

4. The method according to claim 1, further comprising applying an adhesive layer to the hook on the first sheet.

5. The method according to any one of claim 1, further comprising pressing the sheets together with a stamp.

6. The method according to claim 1, further comprising pressing the sheets onto each other with a roller.

7. The method according to claim 6, further comprising guiding the roller with a manipulator.

8. The method according to claim 1, further comprising holding the hook in the first sheet with a strut at least during the bonding.

9. The method according to claim 1, further comprising moving the strut during the forming of the carrier and after the achievement of a specific pressure.

10. The method according to claim 1, further comprising unrolling at least one of the sheets from a roll, shaping the sheet and then cutting off the sheet from the roll.

11. The method according to claim 1, further comprising providing the first sheet is one leg at the end of the hook, whereby the leg sets a distance between the bonded sheets.

12. The method according to claim 1, further comprising providing the second sheet with a second groove at the end of the leg, whereby the length of the leg corresponds to the length of the area laminated with the first sheet.

* * * * *